Oct. 23, 1956 G. DAVIS 2,767,817
FRICTION DISC WITH REMOVABLE LINING
Filed Sept. 26, 1951 2 Sheets-Sheet 2
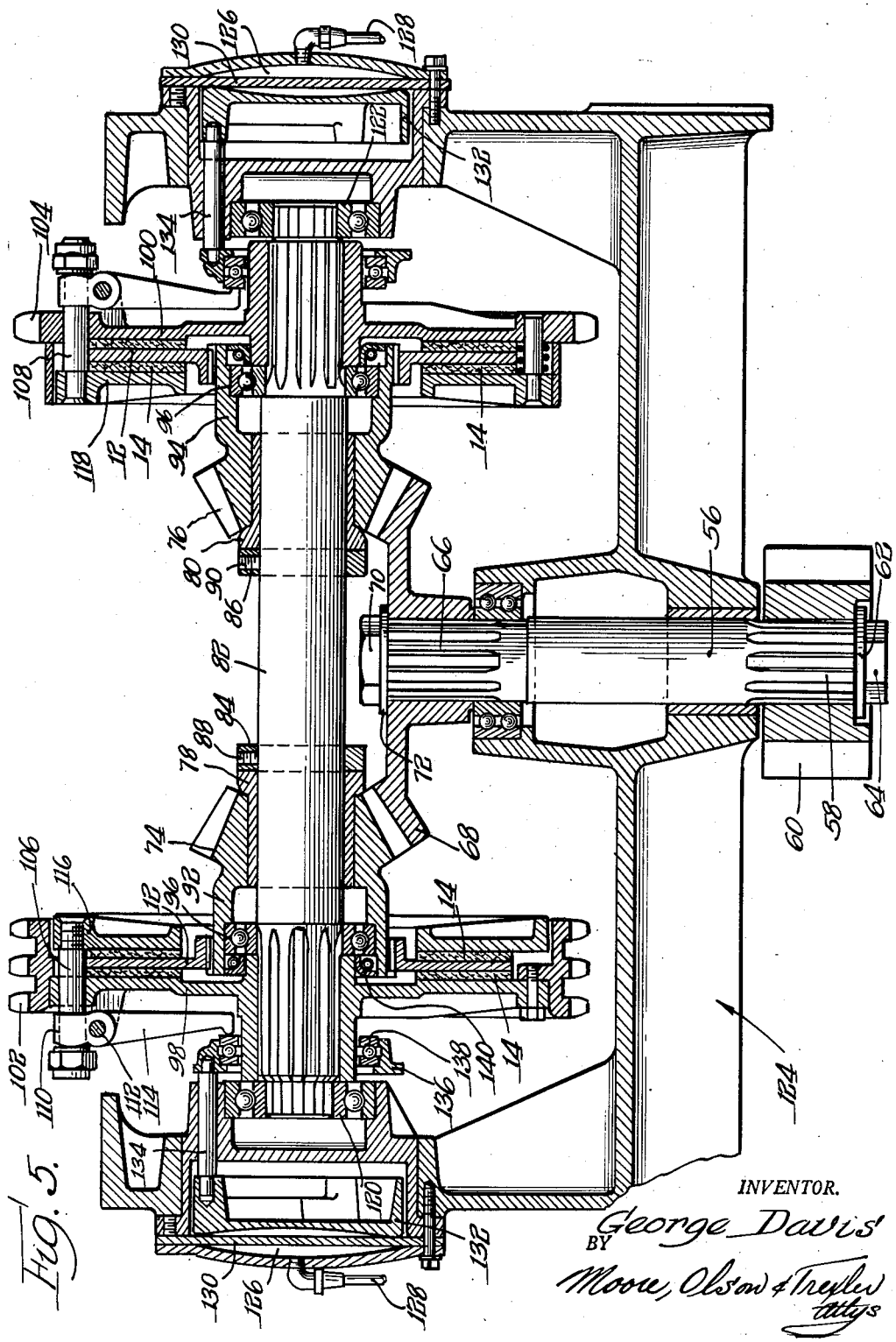
INVENTOR.
George Davis
BY
Moore, Olson & Trexler
Attys

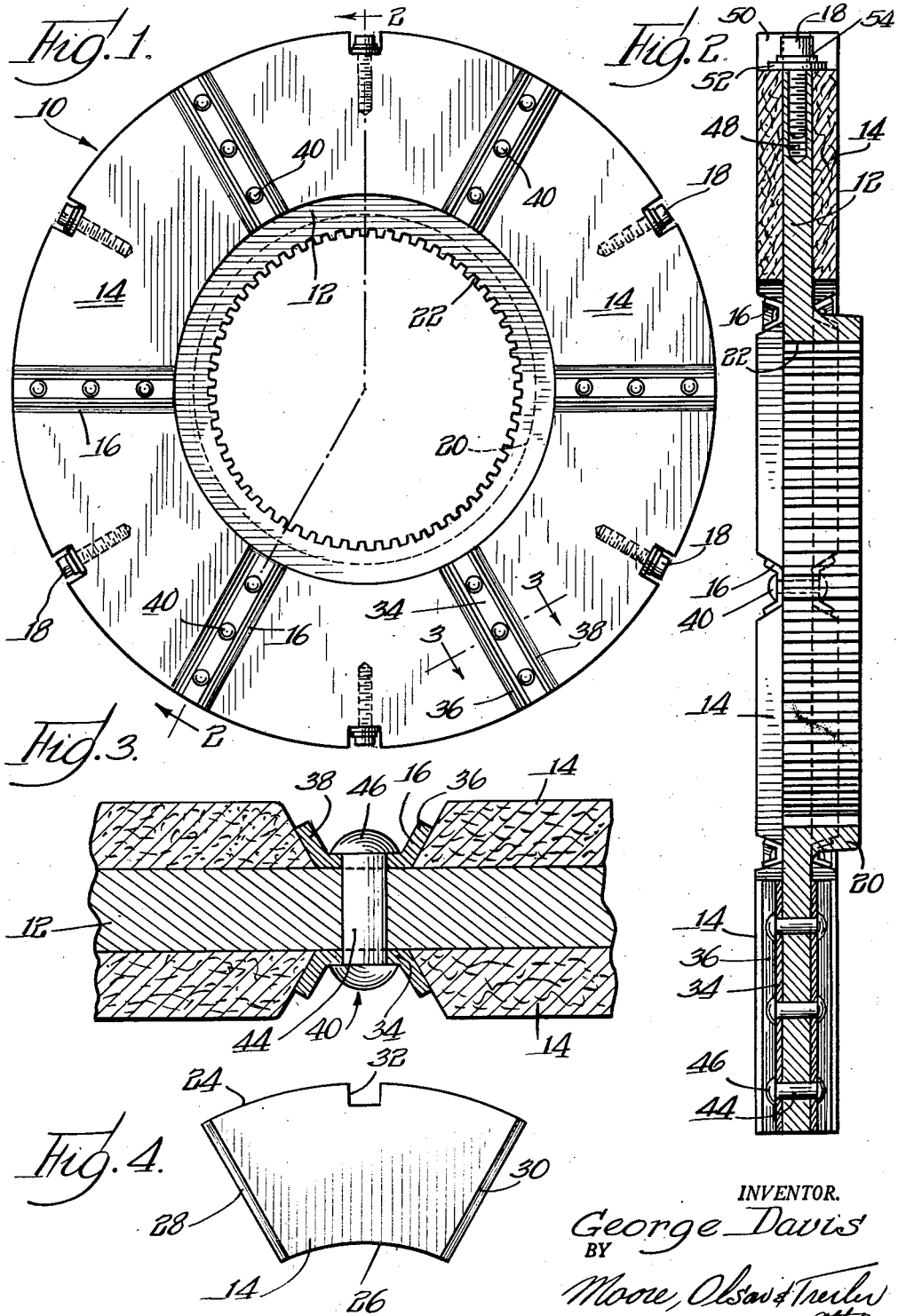

United States Patent Office 2,767,817
Patented Oct. 23, 1956

2,767,817

FRICTION DISC WITH REMOVABLE LINING

George Davis, Benton Harbor, Mich., assignor, by mesne assignments, to Clark Equipment Company, a corporation of Michigan Application September 26, 1951, Serial No. 248,414

9 Claims. (Cl. 192—107)

This invention relates to friction type brakes and clutches and, more particularly, to brakes and clutches in which the frictional engaging surfaces are removable.

Although the brakes and clutches of the present application have general utility, they are particularly advantageous when used in heavy duty installations such as in power cranes, power shovels, excavators, railroad power units and other industrial applications. The clutches and brakes used in such applications heretofore have had certain disadvantages such as difficulty of replacement of worn and damaged clutch or brake facings and limitations as to maximum applied load conditions. More particularly, a replacement of damaged frictional clutch facing members heretofore has been particularly time consuming since machines in which the brakes or clutches are utilized are complicated and must be dismantled to a large degree in order to reach the clutch or brake for repair purposes. In addition, the engaging frictional elements of prior constructions tend to work loose thereby causing chattering and accelerated disintegration of the frictional surfaces. If the portions of the frictional surfaces which are knocked off or otherwise removed are trapped within the clutch or brake assembly, they tend to score or otherwise damage the frictional engaging surface.

Accordingly, it is an important object of the present invention to provide improved brake and clutch assemblies including an improved frictional engaging surface.

More particularly, it is an object of this invention to provide an improved clutch or brake structure in which the frictional engaging surfaces can be readily removed in a very short period of time for repair and replacement.

Another object of the invention is to provide a clutch or brake assembly of the type set forth which can pull an increased load under applied load conditions for a given size of clutch or brake.

Yet another object of the invention is to provide a brake or clutch structure wherein means is provided for increasing heat conduction away from the frictional engaging surfaces and wherein means are provided for carrying away particles produced by wear whereby to eliminate scoring of the frictional face surfaces by such particles.

Still another object of the invention is to provide a brake or clutch assembly in which a single means is provided for holding the frictional face segments in position, the single means preventing chattering and increasing the useful life expectancy of the brake and clutch assembly.

A further object of the invention is to provide a clutch or brake assembly which fulfils the above objects and yet which can be made by well known and inexpensive operations.

These and other objects and advantages of the invention will be better understood from the following description when taken in connection with the accompanying drawings. It is to be understood that the present invention is equally applicable to both the brake and the clutch parts. However, for purposes of description and illustration the invention has been shown embodied in a clutch. The invention is not to be construed as being limited to a clutch structure.

In the drawings wherein like reference numerals have been used to indicate like parts throughout:

Fig. 1 is a plan view of a clutch disc assembly made in accordance with and embodying the principles of the present invention;

Fig. 2 is an enlarged view in cross section of the clutch disc assembly of Fig. 1 substantially as seen in the direction of the arrows along the line 2—2 of Fig. 1;

Fig. 3 is an enlarged partial view in cross section substantially as seen in the direction of the arrows along the line 3—3 of Fig. 1;

Fig. 4 is a plan view of a clutch lining segment made in accordance with the principles of the present invention and designed to be utilized in the clutch disc assembly of Fig. 1; and Fig. 5 is a partial view in vertical section showing a preferred application of the clutch disc assembly of Fig. 1, a swing shaft assembly from a power shovel having been shown for the purposes of illustration.

Referring to the drawings and particularly to Figs. 1 and 2 there is shown a clutch disc assembly generally designated by the numeral 10 made in accordance with and embodying the principles of the present invention. The clutch disc assembly 10 includes a driven plate 12, a plurality of frictional lining segments 14, a plurality of gibs 16 and a plurality of screws 18.

The clutch driven plate 12 is generally circular in shape and is provided with an aperture in the center thereof. A preferred material of construction for plate 12 is metal. As may be best seen in Fig. 2 an upstanding flange 20 surrounds the aperture in the center of plate 12 and extends substantially perpendicularly with respect to the flat surface of plate 12. The length of flange 20 is substantially greater than the thickness of plate 12. The inner periphery of plate 12 defining the central aperture therein has formed thereon a plurality of gear teeth 22 which extend entirely around this inner periphery. These teeth engage a driving mechanism which will be described in connection with Fig. 5.

The frictional lining segments 14 are provided with an outer wall 24 (see Fig. 4) which is curved to correspond to the outer periphery of plate 12. More specifically, the outer wall 24 is in the form of an arc of a circle, the circle having a radius equal to the radius of plate 12. Spaced radially inwardly from wall 24 is a second curved wall 26, the radius of curvature of wall 26 being less than that of wall 24 but both curved surfaces being formed with the same point as the center for their respective radii of curvature. The sides of segments 14 are substantially straight and are herein designated by the numerals 28 and 30. In the form of segments shown in Fig. 4 the sides 28 and 30 converge toward one another at an angle of substantially 60°. But this angularity between sides 28 and 30 is obtained only when six segments 14 are utilized to cover one of the faces of plate 12. This angularity between sides 28 and 30 is less when more than six clutch segments are used and greater when fewer than six clutch segments are used. Referring particularly to Fig. 3, it will be seen that the sides 28 and 30 are beveled at an angle of substantially 30° with respect to a plane perpendicular to the surface of the segment. The beveling of sides 28 and 30 facilitates mounting the segment 14 on the plate 12 in a manner which will be fully illustrated hereinafter. A substantially rectangular notch 32 is formed in wall 24 to receive and cooperate with the screws 18.

Segments 14 are preferably formed of a molded asbestos composition. Other suitable materials such as a woven asbestos composition can also be used. Preferably, the segments 14 are rigid whereby to retain their shape. A preferred method of forming segments is to mold them directly in the form illustrated in Figs. 3 and 4 of the drawings. By making the segments in this manner, costly machining and other forming operations are eliminated. In fact, the segment can be utilized as it comes from the mold due to the advantages of the structure of the present invention to be described below. Certain preferred materials from which to form segments 14 are as follows: the standard asbestos long fibre composition manufactured by the Asbestos Manufacturing Company and sold under specification number 3M–157; the substantially homogeneous composition sold by Thermoid Co., specification number E–278–N2; and the composition sold by Rabestos-Manhattan, Inc. under the specification number R–500–B which is non-metallic in character and substantially homogeneous throughout. It is to be understood that other suitable composition materials can be utilized.

As may be best seen in Figs. 1 and 2 a plurality of segments 14 is applied to each side of plate 12. In certain constructions it may be desirable to apply the segments 14 to only one side of the clutch plate 12. The number of segments utilized on each side of plate 12 in the illustrative example is six. It has been found that a lesser or a greater number of segments may be utilized on each side with good results. Accordingly, the invention is not limited to the use of six segments on the clutch face. When a greater or lesser number of segments is utilized, the angle of convergence on the sides 28 and 30 is suitably adjusted in accordance with the number of segments to be used.

A plurality of gibs 16 form a part of the structure for retaining the clutch segments 14 on the clutch plate 12. Metal is a preferred material of construction for gibs 16. Each gib 16 includes a base portion 34 which is substantially flat and is adapted to be positioned upon one of the sides of clutch plate 12. The base 32 is elongated and has formed on the longitudinally extending edges thereof flanges 36 and 38. The flanges 36 and 38 extend upwardly from the base 34 at an angle of substantially 60°. Preferably, the flanges 36—38 extend the entire length of gib 16.

The gibs 16 are arranged on the clutch plate 12 so that they extend radially outwardly from the geometrical center thereof. The gibs on the opposite side of plate 12 are aligned as illustrated in Fig 3 so that a single rivet generally designated by the numeral 40 can be utilized to hold a pair of gibs assembled on the plate 12 on opposite sides thereof. Each rivet 40 includes a shank portion 44 which extends through suitable apertures on the gibs 16 and through aligned apertures in the clutch plate 12. Each end of shank 44 has a head 46 formed thereon whereby to hold the gibs 16 in firm and fixed relationship with respect to the plate 12. It will be seen that the gibs 16 are immovable with respect to plate 12 and assembled thereon. Three rivets 40 have been shown for holding each pair of gibs 16 in position on plate 12. It is to be understood that a greater or lesser number of rivets could be utilized. In the form of the invention shown in the drawings, the gibs are six in number on each side of plate 12 and are arranged symmetrically around the circumference of plate 12. The distance between the outer ends of adjacent gibs 16 is substantially equal to or slightly greater than the length of the chord of side 24 of the segments 14. It will be seen from Fig. 3 that the beveled sides 28 and 30 of the segments 14 cooperate with the flanges 36 and 38 of the gibs 16 in such a manner that segments 14 can be urged radially inwardly to the position shown in Fig. 1. When the segments are in this position, they are held against displacement in a direction perpendicular to the face of plate 12. By continuing to urge segments 14 radially inwardly, they can be securely held against chattering and other undesired motions with respect to plate 12.

Means is provided to prevent radial displacement of segments 14 outwardly with respect to plate 12 in the form of the screws 18. More specifically, a plurality of threaded apertures 48 are disposed in notches 50 around the circumference of plate 12. The longitudinal axis of apertures 48 extend radially inwardly toward the geometrical center of plate 12. Each of the apertures 48 is disposed midway between adjacent gibs 16. By referring to Fig. 2, it will be seen that the diameter of the apertures 48 is slightly less than the thickness of the plate 12 whereby to accommodate the apertures in the plate without interrupting the surface of the plate.

It will be seen that the notches 32 in wall 24 of segments 14 correspond with and are of substantially the same size as the notches 50 in the periphery of plate 12. In assembling segments 14 upon plate 12, the segments are first moved to the position shown in Figs. 1 and 2. A segment retainer washer 52 is then placed in position as shown in Fig. 2. It will be noted that washer 52 is wider than plate 12 whereby to provide overhanging edges to engage the inwardly disposed edges of segments 14. However, the width of washer 52 is less than the combined thickness of plate 12 and the two segments 14 whereby to accommodate a substantial amount of wear of the segments 14 without interrupting or interfering with the action of the clutch. Washer 52 is held in position by the screws 18. Screws 18 are preferably of the Allen cap screw type, and a split ring lock washer 54 is provided to insure that screw 18 remains in position. From this description it will be seen that screw 18 in cooperation with washer 52 serves to prevent radial displacement of segments 14 outwardly with respect to plate 12. In addition, screw 18 and washer 52 serve to urge the segments 14 into close assembled relationship with the adjacent flanges 36 and 38 of the gibs 16. This manner of assembling segments 14 upon plate 12 insures that the segments are held in position firmly whereby to prevent chattering and other unwanted movement which would tend to cause accelerated wear on segments 14.

Referring to Fig. 3, it will be seen that the length of flanges 36 and 38 of gibs 16 is substantially less than the length of the inclined sides 28 and 30 of segments 14. This construction permits considerable wear of the segments 14 before their replacement becomes necessary. The width of washer 52 described above also makes possible a long life of the segments 14 by permitting considerable wear of the segments before interference with the operation of the clutch occurs due to the presence of washer 52.

Replacement of the clutch segment 14 is achieved by simply unscrewing the associated screw 18. A worn segment 14 can then be removed by pulling it radially outwardly with respect to plate 12. The new segment 14 is then inserted with its beveled edges 28 and 30 disposed beneath the flanges 36 and 38 of the gibs. Screw 18 is then reinserted and the clutch is ready to renew operation. Inasmuch as only a very small portion of the clutch is removed at any one time, the working space or aperture necessary is very small and simple hand holes can be provided in the housing. It will be seen, therefore, that extensive disassembly of the clutch mechanism is eliminated if the only part to be replaced is a segment 14.

By referring to Figs. 2 and 3, it will be seen that the gibs 16, in addition to holding the segments 14 in position upon plate 12, form ventilation passages which extend radially with respect to plate 12. These ventilation passages produce a fan action which aids in heat conduction and heat dissipation. Conduction is aided due to the fact that the gibs are formed of metal, and convection or circulation of air is aided by the fan action produced by movement of the flanges 36—38 and the edges 28—30 of segment 14. In addition, the channels formed by gibs 16 form a means of removing wear particles from the clutch engaging surface as the wear particles are formed. If the wear particles are not removed from the engaging surface, they tend to score or otherwise mar the frictional engaging surface and thereby shorten its life expectancy.

It has been found by actual test that the improved manner of mounting the clutch segments 14 results in a clutch which can pull from 15 to 20 percent greater load under applied load conditions with the same size clutch and the same amount of frictional area. This feature is particularly advantageous when the size of the clutch is limited due to the design or shape of machine with which it is to be used. Likewise, the life expectancy of clutches formed according to the present invention has been found under actual tests to be almost double that of clutches used heretofore. This results in a substantial saving in the cost of clutch maintenance due to the saving in materials and parts and in time for repairs.

Referring now to Fig. 5 of the drawings, there is shown an application in which the clutch construction of the present invention has particular utility. The application as illustrated is that of a swing shaft in a power shovel. This is a heavy duty installation in which the clutch must respond quickly and surely to sudden changes in direction with accompanying great acceleration. The load imposed upon the clutch is extremely high and the wear correspondingly great.

A vertically extending shaft 56 is provided, the lower end of the shaft being splined as at 58 to cooperate with a gear 60. Gear 60 is retained in position by means of a washer 62 and a bolt 64, the entire assembly being mounted upon a carriage or other suitable support. The gear 60 meshes with a control gear which ordinarily is maintained stationary whereby shaft 56 can be considered stationary for the purposes of this illustration.

The upper end of shaft 56 is also splined as at 66 and carries a ring gear 68 which is held in position by a bolt 70 and a washer 72. The ring gear 68 meshes with a pair of beveled gears 74 and 76 which are rotatably mounted upon a pair of bushings 78 and 80 respectively. Bushings 78 and 80 are supported by a horizontally positioned shaft 82 and are held in position thereon by means of collars 84 and 86 and set screws 88 and 90 respectively. The teeth of the gears 74 and 76 are so shaped as to engage and be driven by the teeth of ring gear 68. Each of the gears 74 and 76 has an outwardly extending flange 92 and 94, respectively, formed thereon. The ends of flanges 92 and 94 are provided with gear teeth which mesh with the gear teeth 22 formed on plate 12 of the clutch assembly. Identical sets of ball bearings 96 are disposed between the flanges 92—94 and the shaft 82. Each end of shaft 82 is splined and carries plates 98 and 100, respectively. Plate 98 has attached around the outer circumference thereof a toothed sprocket wheel 102 which is adapted to be driven by a chain (not shown). The outer circumference of plate 100 is also provided with a sprocket wheel 104 which is driven by a chain (not shown). Mounted in suitable apertures in the plates 98 and 100 are a pair of shafts 106 and 108, respectively. One end of the shafts 106—108 receives therearound a collar 110. Collar 110 is pivoted to shafts 106 and 108, respectively, as at 112 and is provided with an extension or arm 114. When arm 114 is moved toward the respective plate 98 or 100, the shafts 106—108, respectively, move outwardly. Attached to the ends of the shafts 106 and 108 are a pair of friction engaging plates 116 and 118, respectively. When the shafts 106 and 108 are moved outwardly away from each other, they move the plates 116 and 118 outwardly and against the clutch segments positioned on clutch plate 12. Inasmuch as the teeth on plate 12 permit movement of plate 12 outwardly with respect to and along shaft 82, the frictional segments on the outward faces of the clutch plate 12 engage suitable friction surfaces on the plates 98 and 100, respectively. Movement of the arms 14, therefore, can in effect clamp plates 98 and 116 about the associated clutch assembly and can clamp plates 100 and 118 and their associated clutch assembly together.

The extreme ends of the shaft 82 are carried by a set of ball bearings 120 and 122. These ball bearing sets are in turn supported by a frame generally designated by the numeral 124 which is the frame of the cab in which the operator sits and on which the power tool is mounted. It is motion of frame 124 in a circular manner about shaft 56 which is desired. The power for obtaining this motion is derived from a prime mover mounted upon frame 124. This prime mover (not shown) serves to drive the chains which engage the sprockets 102—104. These sprockets are continually driven whereby to drive shaft 82. When motion is one direction is desired, one of the arms 14 is moved to engage the associated clutch thereby causing rotation of frame 124 about shaft 56.

The means for moving arms 114 to the clutch engaging position is positioned at the extreme ends of the shaft 82. There is provided a chamber 126 which is hydraulically sealed and which is connected to a source of hydraulic fluid under pressure through a line 128. A flexible diaphragm 130 separates chamber 126 from a member 132 which can be moved by exerting pressure through line 128 thereby moving diaphragm 130. Member 132 has attached at the upper end thereof a shaft 134 which carries on the outer end thereof a ring 136. Ring 136 in turn carries a ball bearing assembly 138, the outer surface of which is engaged by the lower end of arm 114. By exerting hydraulic pressure through line 128, diaphragm 130 is urged inwardly thereby moving member 132 and shaft 134 inwardly against arm 114. Movement of arm 114 in turn engages the clutch assembly. Suitable lubricating means are provided including an oil seal 140 which keeps lubricating oil off of the clutch faces or clutch segments.

The manner in which rotation is achieved by the above described mechanism is as follows. Shaft 56 is maintained stationary. The chains engaging sprocket wheels 102 and 104 drive these sprocket wheels in the same direction which for the sake of argument can be said to be in a direction to move the teeth at the bottom of the sprocket wheels outwardly and at the top inwardly. Since the sprocket wheels are splined directly to shaft 82, this shaft will be continually rotated. Inasmuch as the gears 74 and 76 are not fixedly attached to shaft 82, they will be held stationary by the ring gear 68. If it is desired to rotate the frame 124 clockwise when looking down upon Figure 5, hydraulic pressure is applied to the left hand line 128 whereby to clamp or move plate 116 toward plate 98. This motion engages the associated clutch assembly and causes gear 74 to be rotated in the same direction as the sprocket wheel 102 since the clutch plate 12 is geared directly to gear 74. Gear 74 will in effect walk around upon gear 68 in clockwise manner thereby moving the frame 124. If it is desired to stop rotation of frame 124, the left hand clutch can be disengaged and the right hand clutch momentarily engaged to check motion of frame 124. Movement of frame 124 in a clockwise direction when viewed from above is achieved by clamping the associated clutch assembly between plates 100 and 118.

The above example of an application of the clutch of the present invention brings out many of the advantages of the present construction. The replacement and repair of clutches used heretofore in such an installation required several hours, whereas replacement and repair using the present invention requires in the neighborhood of twenty minutes. The illustrated application is a heavy duty application involving rapid starts and stops and extremely high load conditions. The clutch of the present invention has a long life in such applications and operates in a very smooth and substantially noiseless manner.

Although a preferred example of the present invention and a preferred application of the present invention have been shown for purposes of illustration, it is to be understood that various changes and modifications can be made therein without departing from the spirit and scope of the invention. Accordingly, the invention is to be limited only as set forth in the following claims.

The invention is hereby claimed as follows:

1. A clutch or brake disc assembly comprising a plurality of frictional engaging segments having a plane friction surface for frictionally engaging a juxtaposed relatively movable friction surface, a support plate, means mounting said segments upon said plate with the friction surface of said segments disposed in a common plane, said mounting means including means for holding said segments to prevent separation from said plate in a direction perpendicular to the surface of said plate and means adjustably mounted on said plate and engaging the outer edge of said segments to prevent radial separation between said plate and said segments, said engaging means being adjustable in a radial direction with respect to said plate whereby to adjust said segments radially inwardly and outwardly with respect to said plate.

2. A clutch or brake disc assembly comprising a substantially flat circular plate, a plurality of segments disposed around the periphery of said plate, said segments having substantially plane friction surfaces lying in a common plane, certain of the edges of said segments being disposed radially with respect to said plate and at least one of the edges of said segments being disposed adjacent the periphery of said plate, first means mounted on said plate and engaging said radially extending edges of said segments to prevent movement of said segments in a direction perpendicular to the surface of said plate, and readily removable means mounted on said plate and engaging the outer peripheral edge of said segments and adjustable in a radial direction with respect to said plate to prevent radial displacement of said segments with respect to said plate and to facilitate ready removal and replacement of said segments, said radially removable means adjustably urging said segments radially inwardly with respect to said plate and toward and against said first means.

3. A clutch or brake disc assembly comprising a substantially flat circular plate, a plurality of segments disposed around the periphery of said plate, said segments having substantially plane friction surfaces lying in substantially a common plane, certain of the edges of said segments being disposed radially with respect to said plate and converging toward the center of said plate and at least one edge of said segments being disposed outwardly and adjacent the periphery of said plate, a plurality of gibs mounted on said plate and engaging the radially extending and converging edges of said segments to hold said segments in position upon said plate to prevent movement of said segments away from said plate in a direction perpendicular to the surface of said plate, and adjustable means mounted on said plate and separate from said gibs preventing radial displacement of said segments with respect to said plate and adjustably urging said segments radially inwardly with respect to said plate and against said gibs.

4. A segment for forming the frictional engaging surface of a clutch or brake comprising a body, said body having an engaging surface and a non-engaging surface, a pair of converging sides bounding said surfaces, a part-circular wall joining one end of said converging sides, a part-circular wall joining the other end of said converging sides, said part-circular walls having the center of the radius of curvature of said walls at the same point, the wall joining the ends of said converging sides that are spaced farthest apart having a notch formed therein, and a face joining each adjacent pair of converging sides, the engaging surface having a smaller area than the non-engaging surface whereby said faces are beveled outwardly toward said non-engaging surface.

5. A clutch or brake disc assembly comprising a substantially flat circular plate having a peripheral wall extending therearound, a plurality of segments disposed adjacent the periphery of said plate, said segments having substantially plane friction surfaces lying in a common plane, certain of the edges of said segments being disposed radially with respect to said plate and converging toward the center thereof and at least one of the edges of said segments being disposed adjacent the periphery of said plate, holding means mounted on said plate and engaging said radially extending converging edges of said segments to prevent movement of said segments in a direction perpendicular to the surface of said plate, and a readily removable fastener attached to the peripheral wall of said plate and engaging the outer peripheral edge of said segments to prevent radial displacement of said segments with respect to said plate to urge said segments radially inwardly with respect to said plate and against said holding means, whereby said segments can be removed and replaced from the peripheral edges of said plate and without gaining access to the plane surface of said segments and said plate.

6. A clutch or brake disc assembly comprising a substantially flat circular plate having a peripheral wall extending therearound, a plurality of segments disposed adjacent the periphery of said plate, said segments having substantially plane friction surfaces lying in a common plane, certain of the edges of said segments being disposed radially with respect to said plate and converging toward the center thereof and at least one of the edges of said segments being disposed adjacent the periphery of said plate, holding means mounted on said plate and engaging said radially extending edges of said segments to prevent movement of said segments in a direction perpendicular to the surface of said plate, the peripheral wall of said plate having a threaded aperture therein adjacent each segment, the axis of said apertures extending substantially parallel to the friction surfaces of said segments and radially inwardly toward the center of said plate, and a threaded fastener positioned in each of said threaded apertures and having a head engaging the outer peripheral wall of the adjacent segment to prevent radial displacement of said segment with respect to said plate to urge said segments radially inwardly with respect to said plate and against said holding means, whereby said segments can be removed and replaced from the peripheral edges of said plate and without gaining access to the plane surface of said segments and said plate.

7. A clutch or brake disc assembly comprising a support plate having a peripheral edge and a substantially plane face, a plurality of gibs mounted on the plane surface of said plate and extending radially and converging toward the center thereof, a plurality of frictional engaging segments disposed on said plate and positioned between adjacent gibs, the surfaces of said segments disposed away from said plate being plane and lying in substantially the same plane to provide a friction surface for frictionally engaging a juxtaposed relatively movable friction surface, all portions of said gibs being positioned between said plate and said plane friction surface whereby said friction surface extends outwardly with respect to said gibs, said gibs having attachment portions overlying and engaging portions of said segments positioned between said plane friction surfaces and said plate to hold said segments and prevent separation of said segments from said plate in a direction perpendicular to the surface of said plate, and adjustable means mounted on said plate on the periphery thereof and engaging the outer periphery of said segments to prevent radial separation between said segments and said plate and to urge said segments against said gibs, said adjustable means being easily removable in a direction radially with respect to said plate and parallel to the face of said plate whereby said fastening means and said segments can be removed from said plate from the periphery thereof and without gaining access to the plane surface of said segments or the surface of said plate.

8. A clutch or brake disc assembly as set forth in claim 7, wherein the radially extending sides of the gibs lie in a plane disposed at an acuate angle of less than 90° with respect to the surface of the plate, the confronting sides of adjacent gibs converging toward each other and overlying the adjacent plate surface, and the segments having complementarily shaped sides engaging said sides of said gibs.

9. A frictional clutch or brake segment comprising a body having a frictional engaging surface and a non-engaging surface, said engaging surface having a smaller area than said non-engaging surface, a pair of angularly disposed and converging sides bounding said surfaces, a first wall joining the ends of said converging sides at the point at which said sides are spaced farthest apart, said first wall including two part-circular wall sections and a notch disposed therebetween and extending toward the other ends of said converging sides, a part-circular wall joining the other end of said converging sides, said part-circular wall sections and said part-circular wall having a common center of the radius of curvature thereof, and a face joining each converging side of said engaging surface with the adjacent converging side of said non-engaging surface, said faces being inclined outwardly toward said non-engaging surface.

References Cited in the file of this patent

UNITED STATES PATENTS

| | | |
|---|---|---|
| 455,033 | Criswell | June 30, 1891 |
| 1,024,737 | Miller | Apr. 30, 1912 |
| 1,246,386 | Bly | Nov. 13, 1917 |
| 1,702,000 | Gibson et al. | Feb. 12, 1929 |
| 1,796,433 | Blume | Mar. 17, 1931 |
| 2,236,311 | Eksergian | Mar. 25, 1941 |
| 2,541,979 | Amundsen | Feb. 20, 1951 |

FOREIGN PATENTS

| | | |
|---|---|---|
| 171,503 | Great Britain | Nov. 24, 1921 |
| 273,861 | Italy | May 5, 1930 |
| 497,633 | Germany | May 10, 1930 |